United States Patent [19]

Nishimura

[11] Patent Number: 4,922,179
[45] Date of Patent: May 1, 1990

[54] POWER FEEDING SYSTEM FOR A ROTOR

[75] Inventor: Shinji Nishimura, Himeji, Japan

[73] Assignee: Mitsubishi Denki Kabushiki Kaisha, Tokyo, Japan

[21] Appl. No.: 276,745

[22] Filed: Nov. 28, 1988

[30] Foreign Application Priority Data

Dec. 10, 1987 [JP] Japan ................................. 62-314637
Dec. 10, 1987 [JP] Japan ................................. 62-314638

[51] Int. Cl.⁵ .............................................. H02J 7/24
[52] U.S. Cl. .......................................... 322/25; 322/28
[58] Field of Search ..................... 322/25, 28; 320/64

[56] References Cited

U.S. PATENT DOCUMENTS

| | | | |
|---|---|---|---|
| 3,522,520 | 8/1970 | Goldman | 322/28 |
| 4,117,388 | 9/1978 | Roche | 322/25 |
| 4,210,857 | 7/1980 | Korbell | 322/28 |
| 4,442,396 | 4/1984 | Hucker | |

FOREIGN PATENT DOCUMENTS

| | | |
|---|---|---|
| 2430595 | 1/1975 | Fed. Rep. of Germany . |
| 1041825 | 3/1953 | France . |
| 2100479 | 2/1979 | United Kingdom . |

*Primary Examiner*—R. J. Hickey
*Attorney, Agent, or Firm*—Sughrue, Mion, Zinn, Macpeak & Seas

[57] ABSTRACT

A power feeding system for a rotor comprises an inverter for converting a d.c. voltage into an a.c. voltage, a primary winding connected to an a.c. output terminal of the inverter, a secondary winding magnetically coupled with the primary winding during rotation and a rectifier for rectifying an a.c. output from the secondary winding to produce a d.c. voltage which is applied to a field winding.

1 Claim, 3 Drawing Sheets

POWER FEEDING SYSTEM FOR A ROTOR

The present invention relates to a power feeding system in which power is supplied to a field winding of, for instance, a field pole rotating type rotor.

FIG. 6 is a diagram of a conventional field pole rotating type rotor. In FIG. 6, a reference numeral 1 designates a slip ring electrically connected to a field winding (not shown), a numeral 2 designates a rotary shaft on which the slip ring 1 is supported through an insulating member 3, and a numeral 4 designates a brush which is received in an insulating box 5 and is pushed to the slip ring 1 by means of a spring 6.

In the device having the above-mentioned construction, a current flows from a d.c. power source through the slip ring 1 via the brush 4 to the field winding (not shown), whereby the rotary shaft 2 is rotated. The rotation of the rotary shaft 2 causes the rotation of the slip ring 1 together with the insulating member 3. In this case, the slip ring 1 always keeps a contact with the brush 4 at any angle of rotation to thereby form an electric circuit since the entire circumferential part of the slip ring 1 constitutes an electrode. The brush 4 can follow vibrations in the radial direction of the slip ring 1 due to a pressing force given by the spring 6 until the slip ring 1 reaches a predetermined rotating speed, by which the brush 4 secures the contact with the slip ring 1.

However, since the brush 4 is always in contact with the slip ring 1, there causes a friction between them, so that the brush 4 and the slip ring 1 may be worn, which results in an environmental contamination due to powder produced by the friction. Further, the lifetime becomes short.

When the slip ring 1 is rotated at a high speed, the wearing is accelerated, and the brush 4 may jump from the slip ring. Therefore, there is a restriction in the rotating speed. Further, there are problems such as corrosion in the slip ring 1 due to water, a short-circuiting due to deposition of foreign matters since the outer circumferential part of the slip ring 1 is exposed as an electrode.

It is an object of the present invention to provide a power feeding system for a rotor which prolongs a lifetime; to prevent the rotor from contamination by abrasion powder, and is free from a restriction in a rotating speed.

The foregoing and the other objects of the present invention have been attained by providing a power feeding system for a rotor which comprises an inverter for converting a d.c. voltage into an a.c. voltage, a primary winding connected to an a.c. output terminal of the inverter, a secondary winding magnetically coupled with the primary winding during rotation add a rectifier for rectifying an a.c. output from the secondary winding to produce a d.c. voltage which is applied to a field winding.

In the drawings:

FIG. 3 is a circuit diagram of a dynamo electric machine in which a power feeding system according to the present invention is applied to;

Preferred embodiments of the power feeding system for a rotor according to the present invention will be described with reference to the drawings.

Figure 1:
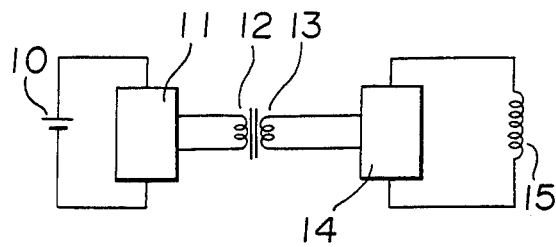
FIG. 1 is a circuit diagram of an embodiment of the power feeding system for a rotor according to the present invention.

In FIG. 1, a reference numeral 10 designates a d.c. power source, a numeral 11 designates an inverter electrically connected to the d.c. power source 10, a numeral 12 designates a primary winding connected to the inverter 11, a numeral 13 designates a secondary winding magnetically coupled with the primary winding 12 and is rotatable around the same, a numeral 14 designates a rectifier connected to the secondary winding 13, and a numeral 15 designates a field winding.

The operation of the power feeding system of the present invention will be described. A d.c. voltage from the d.c. power source 10 is converted into an a.c. voltage by the inverter 1. When an alternating current flows in the primary winding 12, it produces an alternating magnetic field. The alternating magnetic field induces an alternating voltage in the secondary winding 13 and an alternating current is rectified by the rectifier 14, whereby a direct current flows in the field winding 15.

Figure 2:
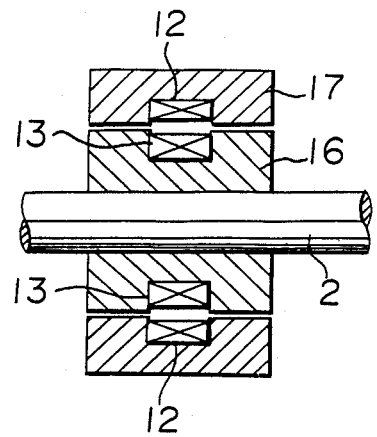
FIG. 2 is a cross-sectional view of an embodiment of the power feeding system of the present invention.

FIG. 2 shows an arrangement of the primary and secondary windings 12, 13 in the power feeding system for a rotor. In FIG. 2, a reference numeral 16 designates a rotating iron core fixed to a rotary shaft 2, the secondary winding 13 being provided on the iron core 16. A numeral 17 designates a stationary iron core placed around the rotating iron core 16 with a predetermined air gap. The primary winding 12 is wound on the stationary iron core 17 so as to correspond to the secondary winding 13.

In an alternating magnetic field produced when an alternating current is supplied to the primary winding 12, a major part of the magnetic flux passes a magnetic circuit formed of the rotating iron core 16, the air gap and the stationary iron core 17. When the magnetic flux crosses the secondary winding 13, an alternating current is induced in the secondary winding 13, whereby the rotary shaft 2 is rotated together with the rotating ion core 16. During the rotation of the rotary shaft 2, the primary winding 12 is always magnetically coupled with the secondary winding 13, with the result that an alternating current flows in the primary winding 12 to produce an alternating magnetic field; thus an alternating voltage is induced in the secondary winding 13.

An embodiment of a dynamo electric machine for an automobile in which the power feeding system of the present invention is used will be described with reference to FIG. 3.

Figure 3:
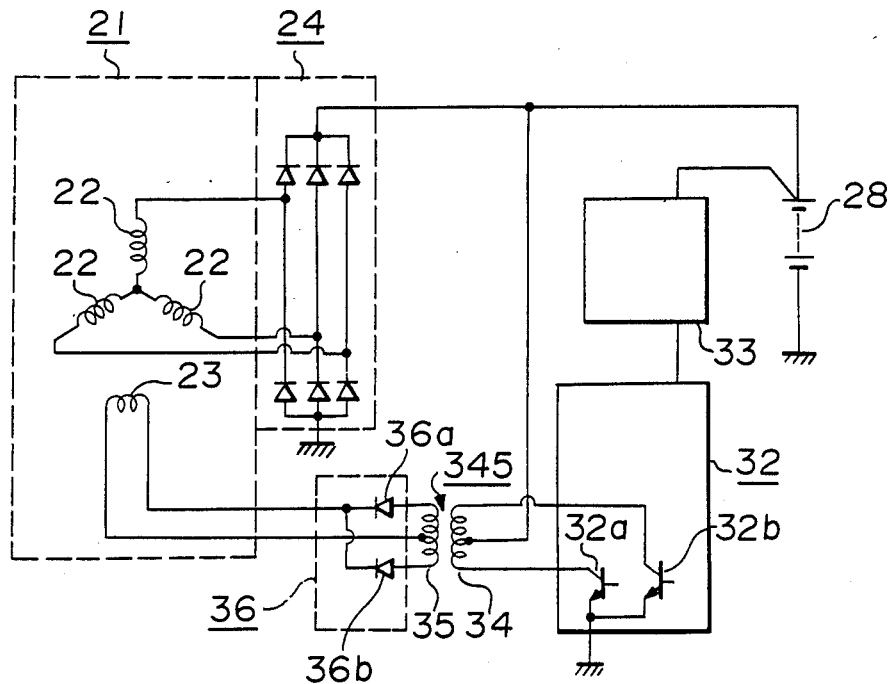

In FIG. 3, a reference numeral 21 designates an a.c. generator which is provided with an armature winding 22 and a field winding 23, a numeral 24 designates a first rectifier for rectifying the output of the a.c. generator 21, and a numeral 32 designates an inverter as a power converting means which receives an instruction from a voltage detecting means 33 and to output an alternating voltage to the primary winding 34 of a transformer 345 by alternately turning on and off transistors 32a, 32b.

The voltage detecting means 33 is adapted to receive a direct current voltage from the positive terminal of a battery 28 and to provide an instruction of voltage to the inverter 32.

The inverter 32 comprises mainly the transistors 32a, 32b. The bases of the transistors 32a, 32b are respectively supplied with instructions of current from the voltage detecting means 33, and the emitters of the both transistors 32a, 32b are respectively grounded. The collectors of the transistors are respectively connected to both ends of the primary winding 34 of the transformer 345. The middle point of the primary winding 34 is connected to the positive terminal of the battery 28.

The secondary winding 35 of the transformer 345 is magnetically coupled with the primary winding 34 and is freely rotatable. The alternating voltage induced at both ends of the secondary winding 35 is rectified by a second rectifier 36. The second rectifier 36 constitutes a single phase full wave rectifier by means of diodes 36a, 36b.

The output terminal of the second rectifier 36 and the middle point of the secondary winding 35 are respectively connected to both ends of the field coil 23.

Figure 4:
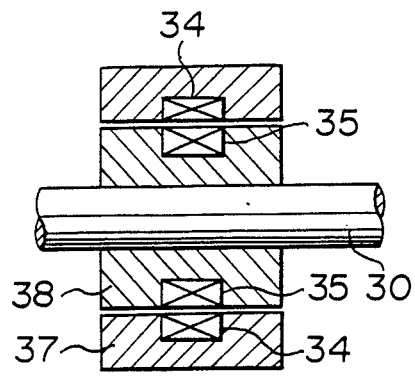
FIG. 4 is a cross-sectional view of an embodiment of a transformer used in the dynamo electric machine as in FIG. 3.
Figure 6:
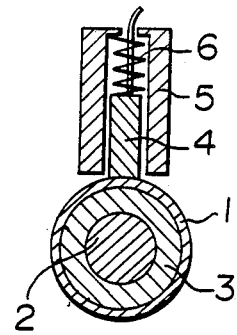
FIG. 6 is a cross-sectional view of a conventional power feeding system for a rotor.

FIG. 4 is a cross-sectional view showing a construction of the transformer 345 comprising the primary and secondary windings 34, 35 which are magnetically coupled and in a rotatable manner. In FIG. 4, a numeral 37 designates a stationary iron core.

The primary winding 34 is wound on the stationary iron core 37. The secondary winding 35 is wound on the rotating iron core 38 so as to oppose the primary winding 34. The rotating iron core 38 is fixed to a rotary shaft 30. The rotary shaft 30 is rotatable together with the field winding 23 of the a.c. generator 1, whereby the rotating iron core 38, the secondary winding 35 and the second rectifier 36 are rotated with the rotary shaft 10.

In the operation of the dynamo electric machine having the construction as above-mentioned, when the transistors 32a, 32b of the inverter 32 are repeatedly turned on and off alternately by instructions from the voltage detecting means 33, an alternating current is supplied to the primary winding 34, whereby an alternating magnetic filed is produced in the magnetic circuit formed of the stationary iron core 37, the air gap and the rotating iron core 38. As a result, an alternating voltage is induced in the secondary winding by a change in the magnetic flux crossing the secondary winding 35. Thus formed alternating current is rectified by the second rectifier 36, whereby a direct current is supplied to the field winding 23.

Under this condition, when the dynamo electric machine is driven by an internal combustion engine (not shown), the field winding 23, the secondary winding 35, the second rectifier 36 and the rotating iron core 38 are rotated together with the rotary shaft 30. In this case, since there is no change in the relation of the magnetic circuit formed of the stationary iron core 37, the air gap and the rotating iron core 38, to the primary winding 34 for causing the alternating magnetic field in the magnetic circuit and to the secondary winding 35 inducing the alternation voltage by crossing the alternating magnetic field, a direct current flows in the field coil 23 in the same manner as above-mentioned. Accordingly, the a.c. generator 1 begins power generation, and an alternating voltage produced in the armature winding 22 is rectified by the first rectifier 24; thus battery 28 is charged.

Assuming that an output voltage from the a.c. generator 21 becomes higher than a predetermined value, then, a current conduction rate in the transistors 32a, 32b in the inverter 32 is decreased by an instruction from the voltage detecting means 33, with the result that the alternating current flowing in the primary winding 34 decreases to weaken the intensity of the alternating magnetic field, hence an induced voltage in the secondary winding 35 decreases. This results in reduction in the current flowing in the field winding 23 and the output of the a.c. generator 21 is also reduced.

When the output voltage of the a.c. generator 21 is lower than the predetermined value, the current conduction rate of the transistors 32a, 32b increases by an instruction of the voltage detecting means 33, whereby the output voltage of the a.c. generator 21 is increased. Thus, the output voltage of the a.c. generator 21 is kept at a predetermined value.

In the above-mentioned embodiment, a single phase inverter is used as the inverter 32 and a single phase full wave rectifier is used as the second rectifier 36. However, a single phase bridge type inverter and a single phase bridge type rectifier may be used. Further, a combination of a multi-phase a.c. inverter, a transformer comprising the primary and second windings which transform the output voltage of the inverter and a rectifier for rectifying the output of the secondary winding may be used.

In the above-mentioned embodiment, the electric conduction rate of the inverter 32 is changed in order to adjust the output voltage of the a.c. generator 21. However, it is possible to control an alternating current flowing in the primary winding 34.

In the above-mentioned embodiments, the rotating iron core 16 having the secondary winding 13 is inserted in the cylindrical stationary iron core 17 having the primary winding 12 with the air gap formed therebetween in order to obtain a magnetic coupling of the primary and secondary windings 12, 13. However, the rotating iron core and the stationary iron core may be provided in the axial direction with an air-gap formed in the axial direction between the stationary and rotating iron cores. Further, it is possible that the stationary and rotating iron cores 16, 17 may be arranged in a front and back relation, or the magnetic circuit may be formed in either the rotaing iron core 16 or the stationary iron core 17.

Figure 5:
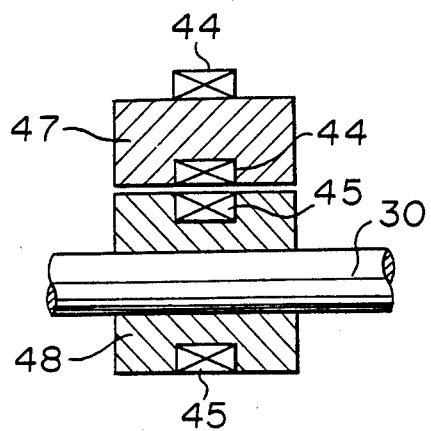
FIG. 5 is a cross-sectional view of another embodiment of the transformer for the dynamo electric machine.

FIG. 5 shows another embodiment of the power feeding system for a rotor according to the present invention in which a primary winding 44 is wound on a stationary iron core so as not to be coaxial with a secondary winding 45 wound on a rotated iron core 48.

In the above-mentioned embodiment, an inverter to convert a direct current into a multi-phase alternating current may be used. In this case, it is necessary to correspond the number of phase of the inverter 11, the primary winding 12, the secondary winding 13, the rotating iron core 16, the stationary iron core 17 and the rectifier 14 to the number of phases of the converted alternating current. With the modified construction, a pulsating rate in a direct current output voltage can be reduced.

Figure 7:
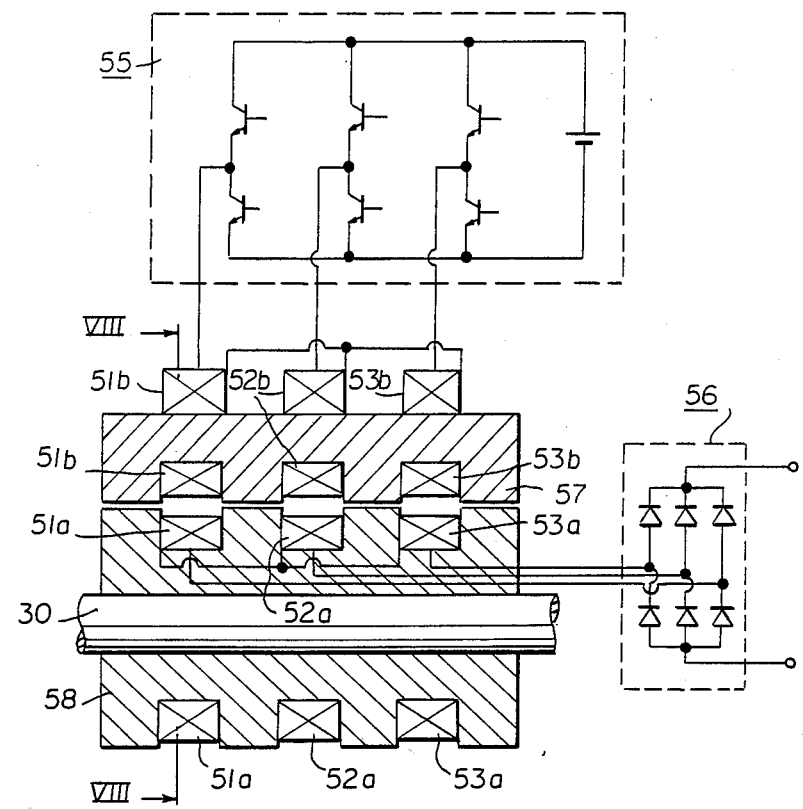
FIG. 7 is a cross-sectional view of still another embodiment of the transformer for the dynamo electric machine.
Figure 8:
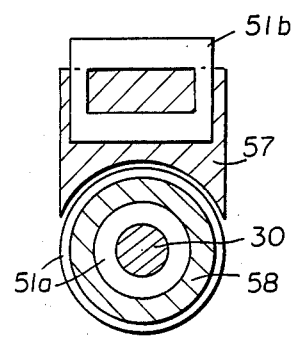
FIG. 8 is a cross-sectional view taken along a line VIII—VIII in FIG. 7.

FIGS. 7 and 8 depict still another embodiment of a power feeding system for a rotor constructed in accordance with the present invention. In this embodiment, three-phase primary and secondary windings are employed. More specifically, a driver circuit 55 is connected to three primary windings 51*b*, 52*b* and 53*b* wound on a stationary iron core 57. Opposed to respective ones of the three primary windings, secondary windings 51*a*, 52*a* and 53*a* are wound upon a rotated iron core 58, the latter carried upon a rotating shaft 30. A rectifier circuit 56 is connected to the secondary windings 51*a*, 52*a* and 53*a* to provide a d.c. output.

As described above, in accordance with the present invention, a d.c. power source is connected to a primary winding through an inverter, a secondary winding is magnetically coupled with the primary winding, and the secondary winding is connected to a field winding through a rectifier. Accordingly, power supply to a rotor can be carried out without contact. In the present invention, the lifetime of the rotor can be prolonged and there is no environmental contamination because powder is not produced by a frictional contact. Further, there is no restriction in a rotating speed. In addition, there is no short circuit due to deposition of water or foreing matters because the electrode is not exposed. The power feeding system of the present invention is highly reliable.

I claim:
1. A power feeding system for a rotor, comprising:
an inverter for converting a d.c. voltage into a multiphase a.c. voltage;
a plurality of primary windings, one for each phase of said a.c. voltage, connected to output terminals of said inverter;
a plurality of cylindrical stationary iron cores, one for each of said primary windings;
a secondary winding magnetically coupled with said primary windings during rotation;
a rotary iron core attached to a rotary shaft at a central bore thereof, said secondary winding being wound on said rotary iron core, said stationary iron cores being disposed adjacent said rotary cores with axes of said stationary iron cores being parallel to a central axis of said stationary core with said primary windings being non-coaxial with respect to said secondary winding; and
a rectifier for rectifying an a.c. output from said secondary winding to produce a d.c. voltage which is applied to a field winding.

* * * * *